T. F. LEDBETTER.
DRIVE MECHANISM.
APPLICATION FILED FEB. 16, 1920.

1,397,219.

Patented Nov. 15, 1921.
2 SHEETS—SHEET 2.

Witness
Chas. R. Grieshauer

Inventor
Thomas F. Ledbetter;
By Cushman, Bryant & Darby
Attorneys

UNITED STATES PATENT OFFICE.

THOMAS F. LEDBETTER, OF COLUMBUS, GEORGIA.

DRIVE MECHANISM.

1,397,219.  Specification of Letters Patent.  Patented Nov. 15, 1921.

Application filed February 16, 1920. Serial No. 359,098.

*To all whom it may concern:*

Be it known that I, THOMAS F. LEDBETTER, a citizen of the United States, residing at Columbus, in the county of Muscogee, and State of Georgia, have invented new and useful Improvements in a Drive Mechanism, of which the following is a specification.

This invention relates to motor vehicles and more particularly to the provision of an improved drive mechanism of the type in which both the front and rear wheels are transmitted power from the motor.

In a prior Patent, No. 1,258,126, granted to me, there is shown an invention of this type which contemplates the provision of two distinct differential mechanisms, one for the front set of wheels and the other for the rear set of wheels. Moreover, in this prior patent there is shown and claimed a specific form of front wheel drive construction in which the front wheel is located within a yoke pivotally connected to the front axle and is supported entirely by its drive shaft.

The purpose of my present invention is to improve the drive mechanism shown in this prior patent by the provision of a single differential mechanism for both the front and rear set of wheels and by materially altering the construction of the front wheel drive. By an inspection of my prior patent it will be observed that the front wheels are entirely supported by their spindle or drive shaft, and should this shaft become broken, the defect must be cured before the vehicle can be further used. Furthermore, it is desirable to eliminate the construction wherein a yoke extends over the wheels.

While the above are the two primary objects of my invention it should be understood that I have numerous other objects of a similar character, such as the provision of a compact and durable differential structure which is very simple and efficient in operation.

I am aware of the fact that it is old in the art to provide a single differential which acts upon both the front and rear set of wheels, but so far as I am aware, I am the first to disclose a differential for this purpose of the type which is hereinafter described. The above and other objects of my invention will be come more apparent from a reading of the following description, an inspection of the accompanying drawings, and a consideration of the appended claims, wherein my invention is more specifically set forth.

Figure 2:
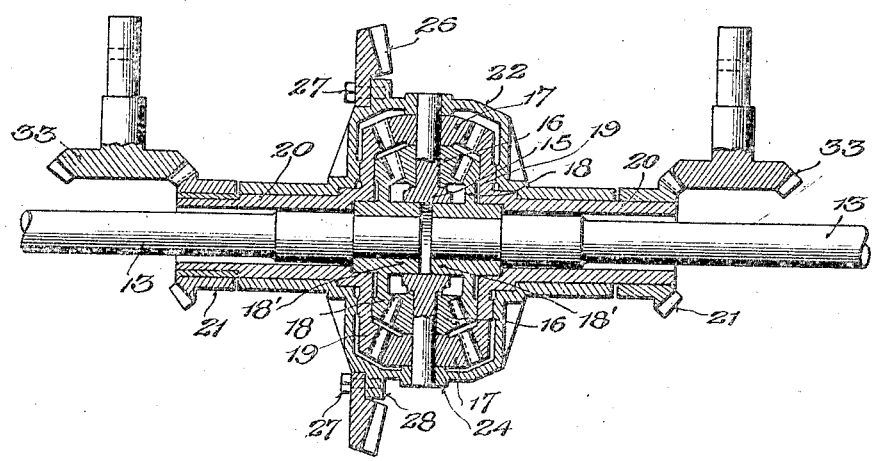
Fig. 2 is a horizontal cross sectional view of the differential mechanism, the axle housing being removed.

Referring to the drawings more in detail, 10 indicates the chassis of a vehicle having any source of power M, such as an internal combustion engine or an electric motor, from which extends a drive shaft 11 toward the rear wheels 12. The rear wheels are mounted upon the outer ends of rear shafts 13 (Fig. 2) which are located within the usual rear axle housing 14 in which is also contained my improved differential.

This differential (Fig. 2) comprises a spider 15 having located on the arms thereof at radially different distances from its center two sets of pinions 16, 17. With the first set of pinions 16 there meshes a pair of miter gears 18, one gear being located on each side of the spider and suitably keyed or otherwise secured to the inner ends of the rear wheel shafts 13. It may be observed at this point that the hubs 18' of each of these gears extend in the direction of the spider and form together a bearing for the spider in its rotary movement. Meshing with the outer set of pinions 17 is a pair of miter gears 19 arranged concentrically with the gears 18 on each side of the spider, and connected to the gears 19, or formed integrally therewith as shown, are hollow shafts 20 which fit about the rear wheel shafts 13 and have located upon them at their respective outer ends bevel pinions 21 as clearly indicated in Fig. 2. Secured to the spider arms and inclosing the pinions and miter gears is a housing 22 which may be formed in two parts, suitably bolted together as at 23, Fig. 1, the outer ends of the spider arms fitting within openings 24 in this housing.

Power may be transmitted to the differential from the power shaft 11, a bevel gear 25 upon the end of the power shaft meshing with a ring gear 26 located upon the differential housing in any suitable manner, in the present instance it being shown bolted, as at 27, to an exterior flange 28. It will be, of course, understood that this ring gear may be formed integrally with the housing and without involving a material change or alteration in the construction could be situated upon the interior thereof. The power shaft 11 at the point where it meets the ring gear of the differential may have a bearing in the rear axle housing as at 29, in which housing there are also bearings 30 and 31 for shafts 32 provided with bevel gears 33 which mesh with the bevel pinions 21 and transmit power to the front wheels in a manner now to be described.

Figure 1:
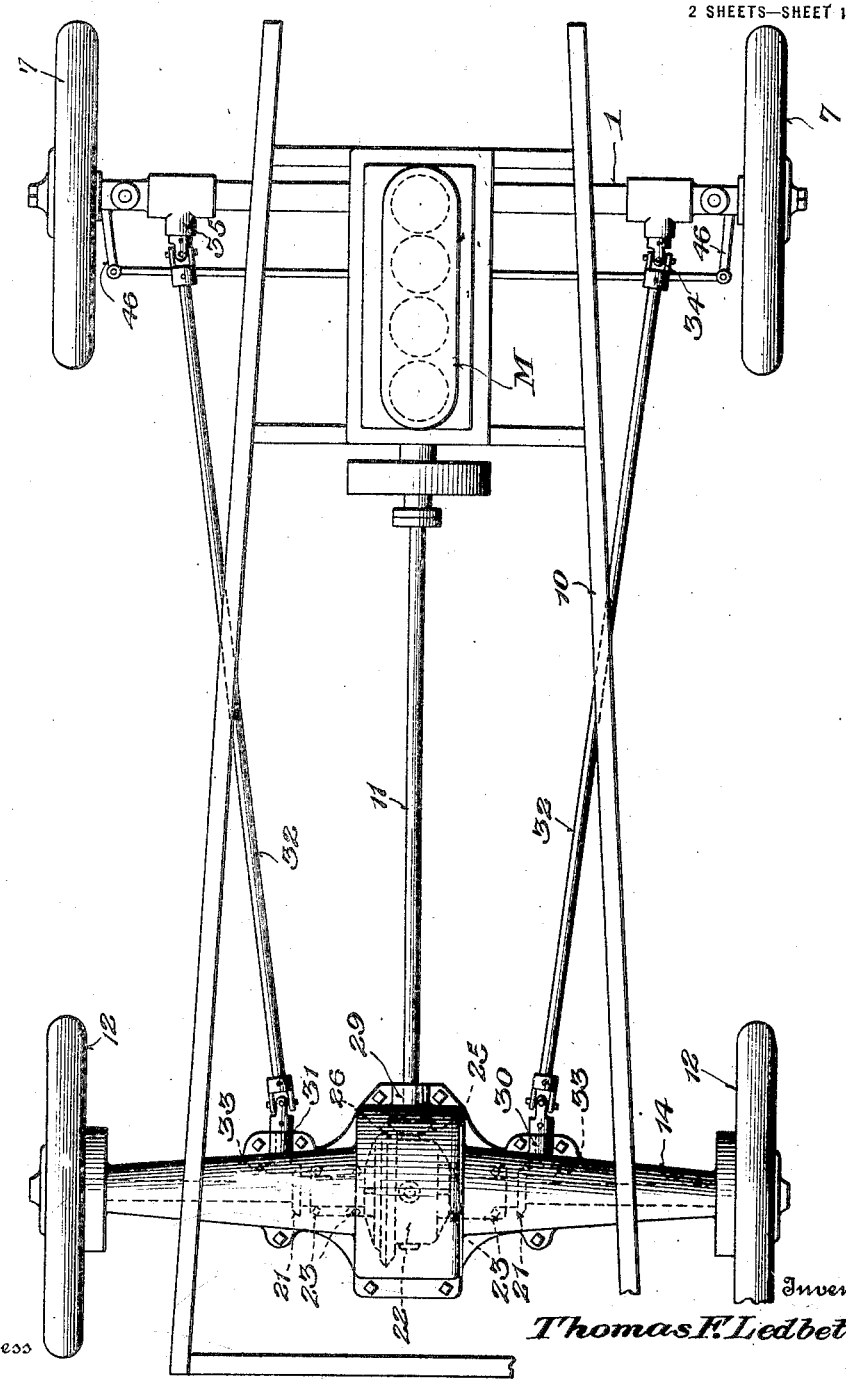
Figure 1 is a top plan view of the chassis of a vehicle with my drive mechanism applied.

The shafts 32 have located therein, at points adjacent the front and rear wheel shafts, universal joints 34, as shown in Fig. 1, and at their forward ends have bearings, as at 35 upon the front central axle section 1.

Figure 3:
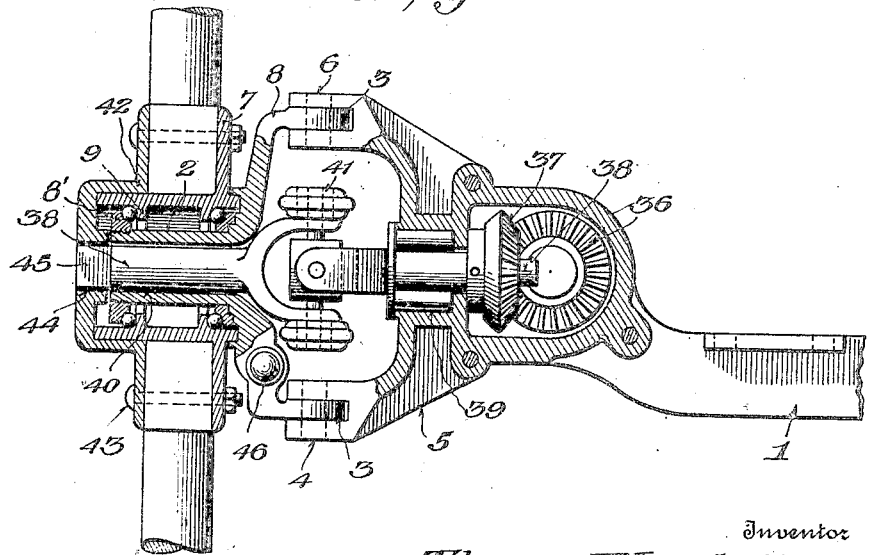
Fig. 3 is a sectional elevational view of a portion of the front wheel drive.

Referring now to Fig. 3, and considering the construction of the drive for the front wheels, it will be observed that there is shown a front axle having a central section 1, and pivoted to this section are end axle sections 2 which have ears 3 each of which fit between two ears 4 formed upon arms 5 of the central axle section. Pivot pins 6 may be fitted through registering openings formed in the ears 3 and 4 to complete the pivotal connection of the axle sections.

The front wheels 7 are journaled upon the end axle sections 2 and ride upon ball bearings shown in Fig. 3, which have as their outer races, washers 8, 8', and as their inner races, flanges 9 formed upon the interior of the wheel 7. It will be noted that the outer race 8' is threaded upon the end of the axle and thus locks the wheel 7 upon its journal.

In order to transmit to the front wheels the rotation of the shafts 32 extending from the rear axle, these shafts 32 are provided at their forward ends with gears 36 meshing with bevel gears 37 fixedly secured in any suitable manner to the ends of shafts 38 having bearings 39 in the central axle section and bearings 40 in the outer axle sections. In order to permit relative movement of the two axle sections the shaft 38 has located therein a universal joint 41. This shaft may be connected to the front wheels by means of a hub cap 42 secured to the wheel, as by bolts 43, and having at its central portion a socket 44 to fixedly receive the angular or squared end 45 of the shaft 38. It will be noted by this construction that there is provided a very simple drive connection with the front set of wheels and that the front wheels are entirely supported by their axles, the weight of the vehicle therefore not resting in any way upon the shafts 38. It should also be noted that the outer axle sections have located thereon arms 46 which extend rearwardly therefrom and may be connected to the steering post in any usual manner.

It should be evident from the above description that I have disclosed a front wheel drive which is superior to that disclosed in my prior patent, and a differential construction which is extremely durable, simple, and compact in structure. The gears of this differential are all inclosed by the housing 22 to which the spider is secured and thus the differential will retain, for long periods of time, its lubricant without any assistance from the axle housing. It should further be understood that although I have described a specific form of front wheel construction, and a specific form of differential, such modifications may be made in these features and in the other parts of my drive mechanism as come within the scope of the appended claims.

What is claimed is:

1. In a four wheel drive, a double differential mechanism for both front and rear wheels comprising a spider, two sets of bevel pinions arranged on the arms of the spider and at radially different distances from its center, a pair of gears, one on each side of said spider, meshing with one of said sets of pinions, said pair of gears having hollow hubs, a rear axle section fitting into driving relation with each of said hubs, a second pair of outer gears concentric with said first mentioned gears, arranged on each side of the spider and meshing with the other set of pinions, each of said last mentioned gears having an elongated hollow hub, a gear on each hub, driving connections between each hub gear and a front wheel, a rotatable housing inclosing said spider and gears and connected to said spider, and a ring gear on said housing, said housing having laterally extending portions inclosing the elongated hubs of said second pair of gears.

2. In a four wheel drive, a double differential mechanism for both front and rear wheels comprising a spider, two sets of bevel pinions arranged on the arms of the spider and at radially different distances from its center, a pair of gears, one on each side of said spider, meshing with one of said sets of pinions, said pair of gears having hollow hubs, a rear axle section fitting into driving relation with each of said hubs, a second pair of gears concentric with said first mentioned gears arranged on each side of the spider and meshing with the other set of pinions, each of said last mentioned gears having an elongated hollow hub, a gear on each hub, driving connections between each hub gear and a front wheel, a rotatable housing inclosing said spider and gears and connected to said spider, and a ring gear on said housing.

In testimony whereof I have hereunto set my hand.

THOMAS F. LEDBETTER.